United States Patent [19]
Scholl

[11] Patent Number: 6,093,756
[45] Date of Patent: Jul. 25, 2000

[54] PROCESS FOR THE PREPARATION OF RUBBER MIXTURES CONTAINING WATER REPELLENT OXIDE OR SILICATE FILLERS, AND THE USE THEREOF FOR THE MANUFACTURE OF TIRES

[75] Inventor: Thomas Scholl, Gladbach, Germany

[73] Assignee: Bayer Aktiengesellschaft, Germany

[21] Appl. No.: 09/231,133

[22] Filed: Jan. 15, 1999

[51] Int. Cl.[7] .................................................. C08K 3/00
[52] U.S. Cl. ............................................................. 523/216
[58] Field of Search ............................................. 523/216

[56] References Cited

U.S. PATENT DOCUMENTS

| | | |
|---|---|---|
| 3,994,742 | 11/1976 | Russell et al. ...................... 106/288 Q |
| 4,514,231 | 4/1985 | Kerner et al. . |
| 4,704,414 | 11/1987 | Kerner et al. . |
| 5,227,425 | 7/1993 | Rauline . |

FOREIGN PATENT DOCUMENTS

| | | |
|---|---|---|
| 304866 | 12/1972 | Austria . |
| 0753549 | 1/1997 | European Pat. Off. . |
| 0890600 | 1/1999 | European Pat. Off. . |
| 2 141 159 | 8/1971 | Germany . |
| 2 255 577 | 11/1972 | Germany . |
| 2 308 588 | of 0000 | United Kingdom . |
| WO 9847955 | 1/1997 | WIPO . |

*Primary Examiner*—Edward J. Cain
*Attorney, Agent, or Firm*—Connolly Bove Lodge & Hutz

[57] ABSTRACT

Rubber mixtures composed of at least one rubber and at least one water repellent oxide or silicate filler are prepared by treating the filler used, which contains <3 wt. % of physically bound water, with 1 to 100 parts by wt. of a plasticizer, based on 100 parts by wt. of filler, and mixing the filler thus treated in the conventional manner with the rubber used.

6 Claims, No Drawings

PROCESS FOR THE PREPARATION OF RUBBER MIXTURES CONTAINING WATER REPELLENT OXIDE OR SILICATE FILLERS, AND THE USE THEREOF FOR THE MANUFACTURE OF TIRES

The present invention relates to a process for the preparation of rubber mixtures comprising at least one rubber and at least one water repellent oxide or silicate filler. Moreover, the present invention relates to the use of the rubber mixtures prepared according to the process of the invention for the manufacture of tyres which have low rolling resistance and high abrasion resistance.

The use of oxide or silicate fillers which were optionally modified by appropriate surface treatment in tyre rubbers is well known. The modification of the oxide or silicate fillers used, for example, with polysulfide silyl ethers, particularly bis(triethoxysilylpropyl) tetrasulfide, serves in particular to improve the processing performance of the silicate or oxide fillers used and to improve the filler/matrix coupling in rubber systems containing filler (see, e.g., U.S. Pat. Nos. 4,514,231 and 4,704,414 and DE 2 141 159 and 2 255 577). Disadvantages of using polysulfide silyl ethers for the surface modification of oxide or silicate fillers are the laborious production process and the high raw material costs of the polysulfide silyl ethers. Other sulfur-free silanes have also been used for the surface treatment of fillers, particularly for rendering the fillers water repellent. Said silanes form a firm chemical bond with the silica surface, however, and therefore have an adverse effect when used in rubber articles. An aim of the present invention was, therefore, to improve the effectiveness of the expensive polysulfide silyl ether filler activators with low-cost additives with the result that either advantages in processing and end properties are obtained and/or the amount of expensive polysulfide silyl ether required can be reduced without sacrificing the end properties.

Low-cost additives used to improve the processing performance of rubber mixtures and the end properties of rubber vulcanisates include plasticisers, particularly mineral oil plasticisers. Reference is made in this connection to the use of aromatic plasticisers in silica-filled tyre treads (see in this context U.S. Pat. No. 5,227,425 and EP 732 362). According to the known state of the art, rubber, filler and plasticiser are mixed in such a way that the rubber used, the oxide or silicate filler used such as silica, and the plasticiser are fed separately to an internal mixer and mixed at elevated temperature. Mineral oil/silica mixtures with improved dust performance are described in GB 2 308 588. No effect of the treatment process and water content on the wet skid resistance/rolling resistance of tyres was ascertained. The silicas used are commercial precipitated silicas containing about 5 to 6 wt. % of physically bound water.

It has now been found that as a result of the process according to the invention, rubber mixtures containing a water repellent oxide or silicate filler may be prepared which, in view of the particular mode of preparation, lead to improved processability of the rubber mixtures combined with a more favourable vulcanisation performance and improved mechanical and dynamic properties which are reflected in improved abrasion resistance and more favourable wet skid resistance/rolling resistance.

The present invention provides, therefore, a process for the preparation of a rubber mixture comprising at least one rubber and 5 to 300 parts by wt. of at least one water repellent oxide or silicate filler, based on 100 parts by wt. of the rubber used in each case, which is characterised in that the filler used, which contains $\leq 3$ wt. % of physically bound water, is treated with 1 to 100 parts by wt. of a plasticiser, based on 100 parts by wt. of filler, and the filler thus treated is mixed in the conventional way with the rubber used.

Plasticisers suitable for the treatment of the fillers according to the invention are, in principle, all the well known plasticisers, particularly plasticisers based on mineral oil, synthetic plasticisers or a natural fat or oil known as a plasticiser. Mineral oil plasticisers, aryl or alkyl phosphates or unsaturated vegetable oils are suitable in preference.

The term mineral oil plasticisers means paraffinic, naphthenic or aromatic mineral oils with a VDC (viscosity-density constant) of 0.791 to 1.050, preferably 0.85 to 1.0 and refraction intercepts Rj of about 1.04 to 1.07. Such mineral oil plasticisers are described, for example, in Ullman, Verlag Chemie, Weinheim, Vol, 13, 1976, page 654 to 658 and are obtainable commercially.

The term synthetic plasticisers means ester plasticisers such as phthalates, adipates, sebacates, phosphates, plasticisers based on ethers and thioethers, polyether and polyetherthioether plasticisers, alkylaryl sulfonates and saturated or unsaturated hydrocarbons with molecular weights 250 to 5.000, especially preferred are those with an additional content of hydroxylgroups of 0.5–7 weight percent. Examples hereof are: dibutyl phthalate, dioctyl phthalate, dioctyl sebacate, and polyesters based on adipic acid and/or sebacic acid with propylene glycol, butane diol and/or hexane diol, trioctyl phosphate, triphenyl phosphate, tricresyl phosphate, diphenyl phosphate, diphenylcresyl phosphate, dibenzyl ether, methylene-bis-thioglycollic acid butyl ester, paraffin sulfonic acid phenyl ester, and dimer fatty acid diol.

The term natural fats or oils means vegetable and animal fats or oils and the transesterification, isomerisation, oligomerisation, dehydration and hydrogenation products thereof. These are, e.g., castor oil, cottonseed oil, groundnut oil, olive oil, rape seed oil, sesame oil, sunflower oil, soya oil, wheat germ oil, coconut oil, palm kernel oil, palm oil, rice oil, butter fat, beef suet, lard, sardine oil and the transesterification, isomerisation, oligomerisation, dehydration, oxidation, epoxidation, sulfation and hydrogenation products thereof. Such fats and oils and the preparation, purification and chemical modification thereof are described in Ullmann, Verlag Chemie, Weinheim, 1976, pages 457 to 524.

Aromatic mineral oils, trialkyl phosphates and unsaturated hydroxyl group-containing oils of vegetable origin are used in particular preference. Castor oil and its transesterification, isomerisation, oligomerisation, dehydration, sulfation and hydrogenation products may be mentioned in particular here.

The plasticisers are used preferably in quantities of 1 to 50 parts by wt., based on 100 parts by wt. of filler.

The plasticisers may optionally contain up to 30 wt. % of other polymers in dissolved form, particularly diene rubber, such as NR, IR, SBR, BR, IIR, or NBR rubber.

The oxide or silicate fillers which may be used in the process according to the invention are the well known natural or synthetic fillers; precipitated silicas and/or silicates such as

- silicas prepared by precipitation of solutions of silicates with spec. surfaces of 5 to 1000, preferably 20 to 400 $m^2/g$ (BET surface) and with primary particle sizes of 10 to 400 nm. The silicas may optionally also take the form of mixed oxides with other metal oxides such as aluminium, magnesium, calcium, barium, zinc, zirconium, titanium oxides;
- silicates e.g. aluminium silicate, alkaline earth silicates such as magnesium silicate or calcium silicate, with BET surfaces of 20 to 400 $m^2/g$ and primary particle diameters of 10 to 400 nm, are particularly preferred.

Such oxide or silicate fillers are described in more detail, for example, in J. Franta, Elastomers and Rubber Compounding Materials, Elsevier 1989, pages 401–447.

It is important for the process of the invention that the filler treated with the plasticisers does not exceed a minimum content of physically bound water. In the process according to the invention, therefore, the procedure is such that a filler is used which does not exceed a physically bound water content of ≦3 wt. %, preferably ≦2 wt. %, particularly ≦1 wt. %, based on the filler used. It is opportune, therefore, for the oxide or silicate filler to be used, which normally has a water content of 5 to 6 wt. %, to undergo a drying process. The drying process may be carried out in well known drying units, such as belt dryers, rotary ovens, spin-flash dryers or spray dryers at temperatures sufficient for the desired degrees of drying. The drying times may be a few minutes to several hours. The term physically bound water in this context means the loss on drying of the filler at a temperature of 105° C. according to DIN 787/2.

The drying process can also be conducted in a solvent optionally in the presence of the plasticiser. Suitable solvents are (for example) saturated, unsaturated or aromatic hydrocarbons, e.g. cyclohexane and toluene.

In a particularly preferred variant of the process according to the invention, the commercial filler with a water content of about 5 to 6 wt. % or the filler as a damp filter cake (water content: about 50 to 90 wt. %) is mixed with the plasticiser, optionally in the form of an aqueous emulsion or in an organic solvent, and the mixture is then heated to temperatures such that the required physically bound water content is not exceeded. Drying takes place at temperatures of about 50 to 250° C., particularly at a temperature of up to 220° C.

Moreover, for the purpose of further modification, the well known water repellents may be added, particularly polysulfide silyl ethers, such as bis(triethoxysilylpropyl) tetrasulfide, polydimethylsiloxanes, optionally bearing further SiOH groups, octamethylcyclotetrasiloxane, hexamethyldisilazane, vinyl silanes such as triethoxyvinyl silane, alkyl silanes such as octyltriethyl silane and octadecyltriethoxy silane, aminosilane, such as 3-aminopropyltriethoxysilane.

In comparison with the simple physical mixtures, the fillers treated according to the invention with the plasticisers are not wetted by water or at least undergo delayed wetting, and have methanol wettabilities of 0 to 50%, preferably 5 to 40%. The methanol wettability indicates the proportion by weight of methanol in a methanol/water mixture which is just capable of wetting the filler. The determination of the methanol wettability is carried out as follows:

200 mg of silica and 50 ml of water are introduced into a 250 ml round-bottomed flask with magnetic stirrer. The (partially) water repellent silica remains on the water surface. The tip of a graduated pipette filled with methanol is then immersed in the liquid phase (in order to avoid direct contact with the silica) and the methanol is allowed to flow in slowly. During the addition of methanol stirring is carried out with the magnetic stirrer so that a vortex is produced in the liquid. Methanol is added until the solid substance is wetted. This is the case when the silica is no longer dispersed over the surface of the liquid phase (already containing methanol) and the relatively clear film-free liquid becomes visible.

Evaluation: The methanol wettability is given in wt. % of methanol of the methanol/water mixture according to the formula $$\text{methanol wettability (in wt. \%)} = (0.79 \times \text{number of ml MeOH}/0.79 \times \text{number of ml MeOH} + 50) \times 100$$

According to the process of the invention, the oxide or silicate filler treated with the plasticiser is mixed in the conventional way with the rubbers to be used.

Both natural rubber and the well known synthetic rubbers may be used as rubbers in the process according to the invention. Preferred synthetic rubbers are described, for example, in W. Hofmann, Kautschuktechnologie, Gentner Verlag, Stuttgart 1980. They include, i.a.

BR—polybutadiene
ABR—butadiene/acrylic acid $C_{1-4}$ alkyl ester copolymers
CR—polychloroprene
IR—polyisoprene
SBR—styrene/butadiene copolymers with styrene contents of 1 to 60, preferably 20 to 50 wt. %
IIR—isobutylene/isoprene copolymers
NBR—butadiene/acrylonitrile copolymers with acrylonitrile contents of 5 to 60, preferably 10 to 40 wt. %
HNBR—partially hydrogenated or completely hydrogenated NBR rubber
EPDM—ethylene/propylene/diene copolymers
and mixtures of said rubbers.

Rubbers suitable for the manufacture of motor vehicle tyres with the aid of surface-modified fillers are, in particular, natural rubber, emulsion SBR and solution SBR rubbers with a glass transition temperature above −50° C. which may optionally be modified with silyl ethers or other functional groups as described, e.g., in EP-A 447 066, polybutadiene rubbers with a high 1,4-cis content (>90%) which are prepared with catalysts based on Ni, Co, Ti or Nd, and also polybutadiene rubbers with a vinyl content of 0 to 75% and mixtures thereof. Solution SBR rubbers with a vinyl content of 20 to 60 wt. % and also polybutadiene rubbers with a high 1,4-cis content (>90%) are used in particular preference.

The rubber mixtures according to the invention contain the water repellent oxide or silicate fillers preferably in quantities of 5 to 150 parts by weight, based on 100 parts by weight of the rubber used in each case.

In addition to the water repellent oxide or silicate fillers according to the invention, the rubber mixtures may contain other fillers. These are, in addition to untreated oxide or silicate fillers, carbon blacks. Preferred other fillers are:

highly disperse silicas prepared e.g. by precipitation of solutions of silicates or flame hydrolysis of silicon halides with specific surfaces of 5 to 1000, preferably 20 to 400 $m^2/g$ (BET surface) and with primary particle sizes of 10 to 400 nm. The silicas may optionally also take the form of mixed oxides with other metal oxides such as Al, Mg, Ca, Ba, Zn, Zr and Ti oxides;

synthetic silicates such as aluminium silicate, alkaline earth metal silicate such as magnesium silicate or calcium silicate with BET surfaces of 20 to 400 $m^2/g$ and primary particle diameters of 10 to 400 nm;

natural silicates such as kaolin and other naturally occurring silica;

glass fibres and glass fibre products (mats, strands) or microglass beads;

metal oxides such as zinc oxide, calcium oxide, magnesium oxide, aluminium oxide;

metal carbonates such as magnesium carbonate, calcium carbonate, zinc carbonate;

metal hydroxides such as e.g. aluminium hydroxide, magnesium hydroxide;

carbon blacks; the carbon blacks to be used in this case are prepared by the lamp black, furnace or channel black process and have BET surfaces of 20 to 200 $m^2/g$, such as e.g. SAF, ISAF, HAF, FEF or GOF blacks.

Highly disperse precipitated silicas and carbon blacks are used in particular preference. The fillers mentioned may be used on their own or in mixture.

The rubber mixtures according to the invention may, of course, contain further rubber auxiliaries such as reaction accelerators, antioxidants, heat stabilisers, light stabilisers, antiozonants, processing auxiliaries, plasticisers, tackifiers, blowing agents, dyes, pigments, waxes, extenders, organic acids, inhibitors, metal oxides and activators such as triethanolamine, polyethylene glycol, hexane triol, bis-(triethoysilylpropyl)tetrasulfide which are well known and conventional in the rubber industry. The rubber auxiliaries are added in conventional quantities and depend on the intended application in each case. Conventional quantities are, for example, quantities of 0.1 to 50 wt. %, based on the total quantity of rubber used.

Particularly preferred rubber mixtures contain not only rubber, filler and additional rubber auxiliaries but also 0.1 to 15 parts by weight, based on 100 parts by weight of rubber, of sulphur-containing silyl ethers as filler activators, and in particular bis(trialkoxysilylalkyl)-polysulphides, of the kind described in DE 2,141,159 and DE-AS 2,255,577, oligomeric and/or polymeric sulphur-containing silyl ethers of DE-OS 4,435,3 11 and EP-A 670,347, mercaptoalkyltrialkoxysilanes, in particular mercaptopropyltriethoxysilane, and thiocyanatoalkylsilyl ethers, of the kind described for example in DE-OS 19,544, 469.

The following are very particularly preferred: bis-(triethoxysilylpropyl)-tetrasulphide, the corresponding disulphide, and polysulphides according to EP 670,347 prepared from chloropropyltriethoxysilane, dichloroalkanes and sodium polysulphide, oligo- or poly-(4-(2-triethoxysilylethyl)cyclohexane-1,2-diyl)-bisoligosulphides of DE 4,435,311 and thiocyanatopropyltriethoxysilane. The abovementioned compounds are also surprisingly highly effective even after the oxidic and siliceous fillers have been rendered water-repellent.

In addition to the above-mentioned rubber auxiliaries, the well known crosslinking agents may be added to the rubber mixtures according to the invention, such as sulfur, sulfur donors or peroxides. Moreover, the rubber mixtures according to the invention may contain vulcanisation accelerators such as mercaptobenzthiazoles, mercaptosulfenamides, guanidines, thiurams, dithiocarbamates, thioureas and/or thiocarbonates. The vulcanisation accelerators and the above-mentioned crosslinking agents are normally used in quantities of 0.1 to 10 wt. %, preferably 0.1 to 5 wt. %, based on the total quantity of rubber used in each case.

Vulcanisation of the rubber mixtures according to the invention may be carried out at conventional temperatures of 100 to 200° C., preferably 130 to 180° C. (optionally under a pressure of 10 to 200 bar).

The mixing of the rubbers with the water repellent fillers and the other rubber auxiliaries, crosslinking agents and accelerators mentioned may be carried out in the conventional manner using suitable mixing units such as rollers, internal mixers and compounding extruders.

The rubber vulcanisates according to the invention are suitable for the manufacture of moulded articles e.g. for the manufacture of cable jackets, hoses, drive belts, conveyor belts, roller coatings, shoe soles, packing rings and damping components. In particular, they are suitable for the manufacture of tyres, since such tyres have a particularly low rolling resistance, a particularly high wet skid resistance, and high abrasion resistance.

EXAMPLES

Example 1

Silica treated according to the invention with aromatic mineral oil (37.5:80 parts by wt.)

500 g of Vulkasil S (highly reactive precipitated silica with a BET surface of 180 m²/g from Bayer AG) and 234.4 g of aromatic mineral oil Renopal 450 (Fuchs Mineral ölwerke) were heated in a three-neck flask with stirrer and vertical recovery bend for 6 hours, with stirring, to a temperature of 220° C., about 25 g of water being distilled. 709 g of a brownish powder are obtained. The silica thus rendered partially hydrophobic is not wetted spontaneously by water, in contrast to the starting product, but only (with stirring) after about 1 minute.

Example 2

Silica treated according to the invention with castor oil (8:80 parts by wt.)

The procedure as in Example 1 was followed, 500 g of Vulkasil S (highly reactive precipitated silica with a BET surface of 180 m²/g from Bayer AG) and 50 g of castor oil being heated for 5 hours to 220° C. and water being distilled. 521 g of a colourless powder were obtained. Methanol wettability: 19 wt. %.

Example 3

Silica treated according to the invention with olive oil (8:80 parts by wt.)

The procedure as in Example 1 was followed, 500 g of Vulkasil S (highly reactive precipitated silica with a BET surface of 180 m²/g from Bayer AG) and 50 g of olive oil being heated for 4 hours to 220° C. and water being distilled. 520 g of a colourless powder were obtained.

Methanol wettability: 11 wt. %.

Example 4: (Comparative Example):

Silica mixed with castor oil (8:80 parts by wt.)

The procedure as in Comparative Example 1 was followed, 500 g of Vulkasil S and 50 g of castor oil being heated for two hours to 80° C. 549 g of a white powder were obtained. Methanol wettability: 0 wt. %. The silica treated in this way is wetted spontaneously by water.

Example 5

Rubber mixtures and vulcanisates

The following rubber mixtures were prepared in a 1.5 l kneader at 130° C. Sulfur and accelerator were added at the end on a roller at 50° C. (the quantity details refer to parts by weight):

|  | Comparison 5.A Silica with 5–6% phys. bound | Comparison 5.B Silica with 5–6% phys. bound water + mineral oil | Example 5.1 silica treated acc. to invention with mineral oil (<3% H₂O) |
| --- | --- | --- | --- |
| L-SBR rubber Buna VSL 4020-0 (Bayer AG) | 75 | 75 | 75 |
| BR rubber Buna CB 24 (Bayer AG) | 25 | 25 | 25 |
| Silica Vulkasil S (Bayer AG) | 80 | 0 | 0 |
| Aromat. mineral oil Renopal 4.50 (Fuchs) | 37.5 | 0 | 0 |
| Mixture of 80 phr Vulkasil S and 37.5 phr aromat. mineral oil Renopal 450 (Fuchs) | 0 | 117.5 | 0 |
| Water repellent silica acc. Example | 0 | 0 | 117.5 |
| Carbon black Corax N 339 (Degussa) | 6.5 | 6.5 | 6.5 |
| Zinc oxide | 2.5 | 2.5 | 2.5 |
| Stearic acid | 1 | 1 | 1 |
| Antioxidant Vulkanox 4020 (Bayer AG) | 1 | 1 | 1 |
| Antiozonant wax Antilux 654 (Rheinchemie) | 1.5 | 1.5 | 1.5 |
| Silane Si 69 | 6.5 | 6.5 | 6.5 |
| Sulfur | 1.5 | 1.5 | 1.5 |
| Accelerator Vulkacit CZ (Bayer AG) | 1.5 | 1.5 | 1.5 |
| Accelerator Vulkacit D (Bayer AG) | 2 | 2 | 2 |
| Viscosity of mixture ML 1 + 4 at 100° C. (ME) | 77 | 69 | 64 |
| Vulcanisation performance at 160° C. Monsanto MDR 2000/30 min Time to 90% of final torque (minutes) | 12.8 | 13.9 | 10.8 |

The rubber mixtures were then vulcanised for 35 minutes at 160° C. The following vulcanisate properties were found:

| | | | |
| --- | --- | --- | --- |
| Elongation at break (%) | 440 | 450 | 450 |
| Modulus at 300% elongation (Mpa) | 11.4 | 10.8 | 11.3 |
| Hardness at 23° C. (Shore A) | 73 | 72 | 74 |
| Tensile strength (Mpa) | 18.7 | 18.4 | 18.2 |
| Rebound resilience at 23° C. (%) | 36 | 34 | 33 |
| Rebound resilience at 70° C. (%) | 48 | 49 | 54 |
| Difference between rebound resilience 70/23° C. | 12 | 15 | 19 |
| Abrasion DIN 53 516 (ccm) | 95 | 85 | 68 |

In addition to the improved processing performance of the unvulcanised mixture which manifests itself in the lower Mooney viscosity, the vulcanisates according to the invention have advantages in dynamic damping both at room temperature and at 70° C. which suggest at the same time improved wet skid resistance and rolling resistance of tyres, and also considerable advantages in terms of abrasion resistance.

Example 6

Rubber mixtures and vulcanisates

The following rubber mixtures were prepared in a 1.5 l kneader at 130° C. Sulfur and accelerator were added at the end on a roller at 50° C.:

|  | Comparison 6.A Silica with 5–6% phys. bound water | Comparison 6.B Silica with 5–6% phys. bound water + castor oil | Example 6.1 silica treated acc. to invention with castor oil (<3% H$_2$O) |
|---|---|---|---|
| L-SBR rubber Buna VSL 4020-0 (Bayer AG) | 75 | 75 | 75 |
| BR rubber Buna CB 24 (Bayer AG) | 25 | 25 | 25 |
| Silica Vulkasil S (Bayer AG) | 80 | 0 | 0 |
| Aromat. mineral oil Renopal 450 (Fuchs) | 37.5 | 29.5 | 29.5 |
| Mixture of 80 phr Vulkasil S and 8 phr castor oil acc. to Example 4 | 0 | 88 | 0 |
| Water repellent silica acc. Example 2 | 0 | 0 | 88 |
| Carbon black Corax N 339 (Degussa) | 6.5 | 6.5 | 6.5 |
| Zinc oxide | 2.5 | 2.5 | 2.5 |
| Stearic acid | 1 | 1 | 1 |
| Antioxidant Vulkanox 4020 (Bayer AG) | 1 | 1 | 1 |
| Antiozonant wax Antilux 654 (Rheinchemie) | 1.5 | 1.5 | 1.5 |
| Silane Si 69 | 6.5 | 6.5 | 6.5 |
| Sulfur | 1.5 | 1.5 | 1.5 |
| Accelerator Vulkacit CZ (Bayer AG) | 1.5 | 1.5 | 1.5 |
| Accelerator Vulkacit D (Bayer AG) | 2 | 2 | 2 |
| Viscosity of mixture ML I + 4 at 100° C. (ME) | 77 | 72 | 64 |
| Vulcanisation performance at 160° C. Monsanto MDR 2000/30 min Time to 90% of final torque (minutes) | 12.8 | 14.1 | 14.8 |

The rubber mixtures were then vulcanised for 35 minutes at 160° C. The following vulcanisate properties were found:

| Elongation at break (%) | 440 | 500 | 450 |
|---|---|---|---|
| Modulus at 300% elongation (Mpa) | 11.4 | 9.9 | 11.9 |
| Hardness at 23° C. (Shore A) | 73 | 70 | 78 |
| Tensile strength (Mpa) | 18.7 | 19.4 | 18.2 |
| Rebound resilience at 23° C. (%) | 36 | 35 | 33 |
| Rebound resilience at 70° C. (%) | 48 | 49 | 48 |
| Difference between rebound resilience 70/23° C. | 12 | 14 | 15 |
| Abrasion DIN 53 516 (ccm) | 95 | 73 | 63 |

In addition to the improved processing performance of the unvulcanised mixture which manifests itself in the lower Mooney viscosity, the vulcanisate according to the invention has advantages in dynamic damping and particularly clearly in terms of abrasion resistance. The simple physical mixture of castor oil with silica (2nd column), on the other hand, leads to losses in the reinforcing effect, as may be seen from the reduced modulus at 300% elongation and the lower hardness.

What is claimed is:

1. A process for the preparation of a rubber mixture comprising at least one rubber and 5 to 300 parts by wt. of at least one water-repellent oxide or silicate filler, characterised in that the filler used, which contains ≦3 wt. % of physically bound water, is treated with 1 to 100 parts by wt. of a plasticiser, based on 100 parts by wt. of filler, and the filler thus treated is mixed in the conventional manner with the rubber used.

2. A process according to claim 1, characterised in that the filler used is treated with 1 to 50 parts by wt. of a plasticiser, based on 100 parts by wt. of filler.

3. A process according to claims 1, characterised in that the plasticisers used are mineral oils, synthetic plasticisers or natural unsaturated fats or oils or the transesterification, isomerisation, oligomerisation, dehydration, oxidation, epoxidation, sulfation and hydrogenation products thereof.

4. A process according to claims 1, characterised in that the oxide or silicate filler used is a precipitated silica or a precipitated silicate.

5. A process according to claims 1, characterised in that the filler treated with a plasticiser has a methanol wettability of 0 to 50 wt. %.

6. A process according to claims 1, characterised in that the filler treated with a plasticiser has a methanol wettability of 5–40 wt. %.

* * * * *